US012596721B1

(12) United States Patent
Ashfaq et al.

(10) Patent No.: US 12,596,721 B1
(45) Date of Patent: Apr. 7, 2026

(54) DOMAIN-INTEGRATED CONTEXTUAL RESPONSE ENGINE IN AN ARTIFICIAL INTELLIGENCE SYSTEM

(71) Applicant: Microsoft Technology Licensing, LLC, Redmond, WA (US)

(72) Inventors: Atabak Ashfaq, Vancouver (CA); Haiyuan Cao, Snoqualmie, WA (US); Yu Hu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/988,766

(22) Filed: Dec. 19, 2024

(51) Int. Cl.
 *G06F 7/00* (2006.01)
 *G06F 16/242* (2019.01)
 (Continued)

(52) U.S. Cl.
 CPC ...... *G06F 16/24575* (2019.01); *G06F 16/243* (2019.01); *G06F 16/248* (2019.01); *G06N 20/00* (2019.01)

(58) Field of Classification Search
 CPC ............. G06F 16/3347; G06F 16/3344; G06F 16/332; G06F 16/3322; G06F 16/35;
 (Continued)

(56) References Cited

U.S. PATENT DOCUMENTS

| | | | | |
|---|---|---|---|---|
| 11,978,273 B1 * | 5/2024 | Ramaswamy | ......... | G06N 3/045 |
| 2021/0374524 A1 * | 12/2021 | Feng | ......................... | G06N 3/08 |

(Continued)

FOREIGN PATENT DOCUMENTS

WO 2024015321 A1 1/2024

OTHER PUBLICATIONS

International Search Report and Written Opinion received for PCT Application No. PCT/US2025/050776, Feb. 20, 2026, 12 pages.

*Primary Examiner* — Mohammad A Sana
(74) *Attorney, Agent, or Firm* — Shook, Hardy & Bacon L.L.P.

(57) ABSTRACT

Methods, systems, and computer storage media for providing domain-integrated contextual response management using a domain-integrated contextual response engine in an artificial intelligence (AI) system are described. Domain-integrated contextual response management is a systematic approach that combines specific industry knowledge with contextual understanding to generate accurate, relevant, and specific industry-tailored responses to user queries. Domain-integrated contextual response management further includes fine-tuning models for Retrieval-Augmented Generation (RAG) tasks using customer-specific data based on a two-fold approach involving skill distillation and knowledge distillation (i.e., skill distillation from a more powerful model like Large Language Model "LLM" and knowledge distillation from domain-specific data). Domain-integrated contextual response management also includes creating a synthetic dataset that enables smaller models (e.g., domain-integrated contextual response models) to effectively manage RAG tasks while incorporating domain-specific knowledge. Domain-integrated contextual response management further ensures that the domain-integrated contextual response models can retrieve relevant information, support citations, and decline out-of-domain (OOD) questions.

20 Claims, 10 Drawing Sheets

(51) Int. Cl.
  *G06F 16/2457* (2019.01)
  *G06F 16/248* (2019.01)
  *G06N 20/00* (2019.01)

(58) Field of Classification Search
  CPC ........... G06F 16/24542; G06F 16/2455; G06F
    16/24522; G06F 16/2425; G06F 16/2456;
    G06F 16/2465; G06F 16/2471; G06F
    16/24575; G06F 16/2453; G06F 16/2457;
    G06F 16/215; G06F 16/243; G06F
    16/244; G06F 16/245; G06F 16/248;
    G06F 16/93; G06F 16/383; G06F 16/285;
    G06F 16/9535; G06F 16/3329; G06F
    16/90332; G06F 16/90335; G06F 16/217;
    G06F 16/353; G06N 5/04; G06N 5/01;
    G06N 5/022; G06N 20/00; G06N 20/20;
    G06N 5/018
  See application file for complete search history.

(56) References Cited

U.S. PATENT DOCUMENTS

| 2025/0028744 | A1* | 1/2025 | Sharifi | .................... | G06N 3/096 |
| 2025/0156644 | A1* | 5/2025 | Neerukonda | ........ | G06N 3/0455 |
| 2025/0156955 | A1* | 5/2025 | Ramaswamy | ......... | G06Q 40/08 |

* cited by examiner

GENERATE HUMAN-LIKE
QUESTIONS/CONVERSATIONS
(QUIZ GENERATION, MULTI-
CHUNK GENERATION)

STEP 101

ADD DISTRACTOR
DOCUMENTS
(TOP-K CONTEXT LIST)

STEP 102

INTRODUCE OUT-OF-DOMAIN
QUESTIONS

STEP 103

DISTILL ANSWERS FROM
LLM-RAG AGENT

STEP 104

POST-PROCESSING
KNOWLEDGE DISTILLATION
WITH PARAPHRASED
QUESTIONS

STEP 105

LORA FINE-TUNING ON DATA
MIXTURE

STEP 106

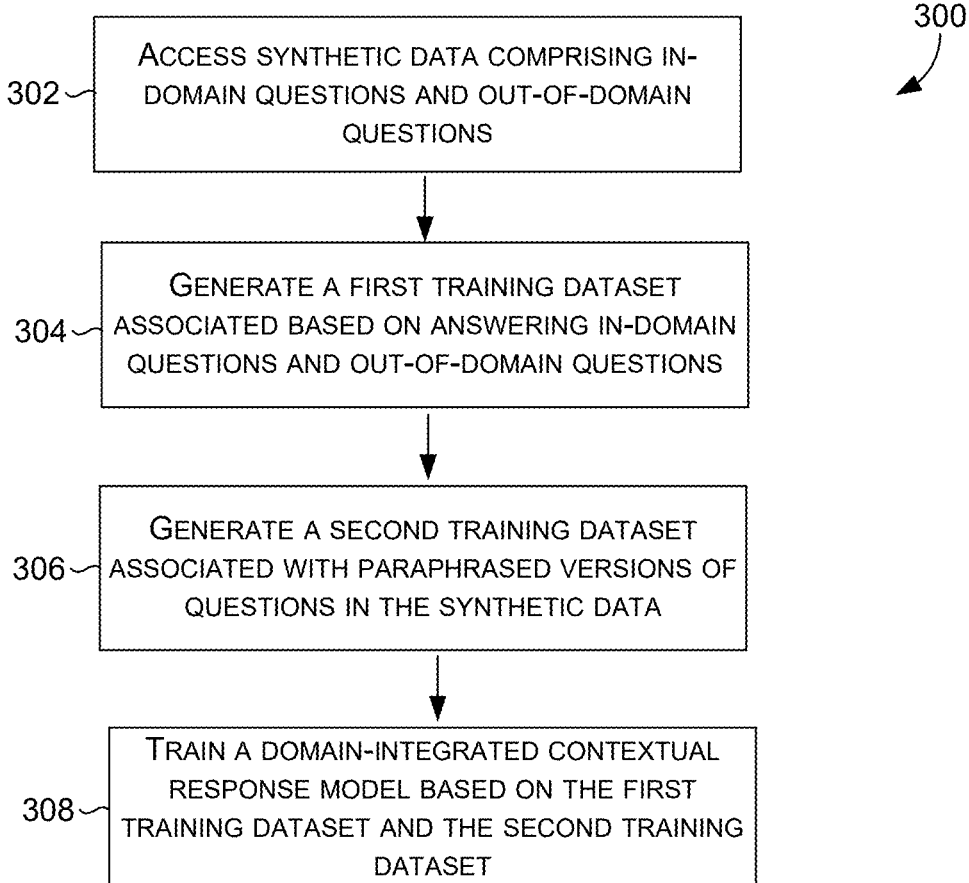

300

302 ⌐ ACCESS SYNTHETIC DATA COMPRISING IN-DOMAIN QUESTIONS AND OUT-OF-DOMAIN QUESTIONS

304 ⌐ GENERATE A FIRST TRAINING DATASET ASSOCIATED BASED ON ANSWERING IN-DOMAIN QUESTIONS AND OUT-OF-DOMAIN QUESTIONS

306 ⌐ GENERATE A SECOND TRAINING DATASET ASSOCIATED WITH PARAPHRASED VERSIONS OF QUESTIONS IN THE SYNTHETIC DATA

308 ⌐ TRAIN A DOMAIN-INTEGRATED CONTEXTUAL RESPONSE MODEL BASED ON THE FIRST TRAINING DATASET AND THE SECOND TRAINING DATASET

*FIG. 3*

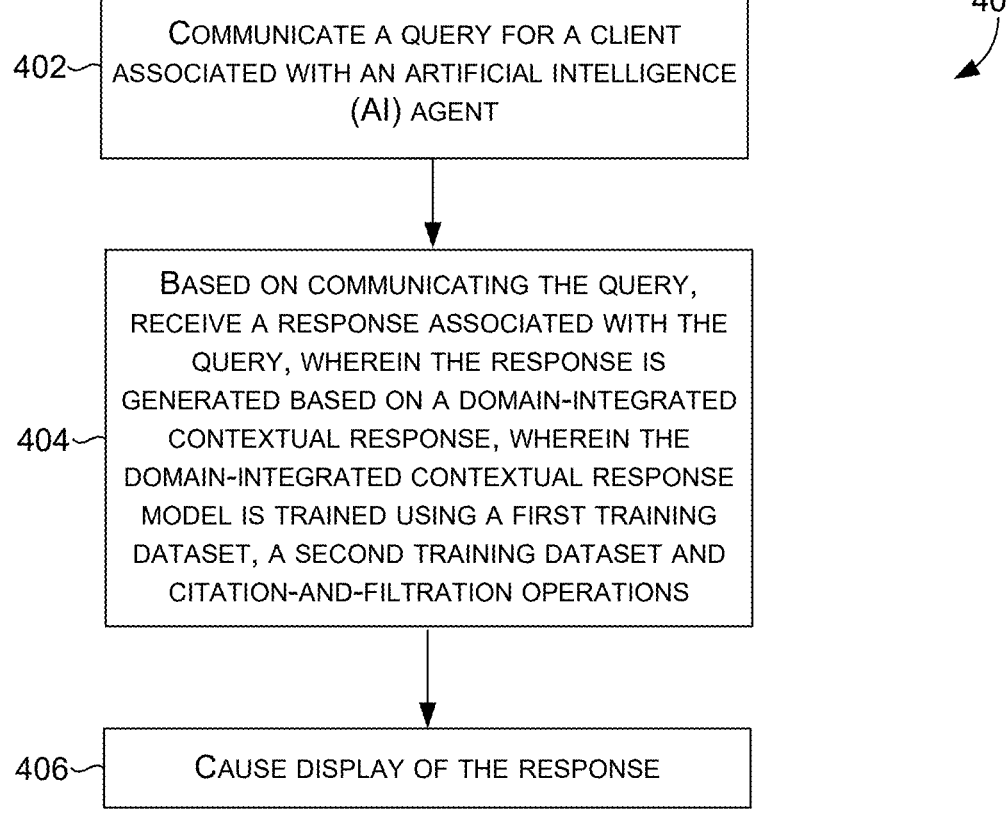

400

402— COMMUNICATE A QUERY FOR A CLIENT ASSOCIATED WITH AN ARTIFICIAL INTELLIGENCE (AI) AGENT

404— BASED ON COMMUNICATING THE QUERY, RECEIVE A RESPONSE ASSOCIATED WITH THE QUERY, WHEREIN THE RESPONSE IS GENERATED BASED ON A DOMAIN-INTEGRATED CONTEXTUAL RESPONSE, WHEREIN THE DOMAIN-INTEGRATED CONTEXTUAL RESPONSE MODEL IS TRAINED USING A FIRST TRAINING DATASET, A SECOND TRAINING DATASET AND CITATION-AND-FILTRATION OPERATIONS

406— CAUSE DISPLAY OF THE RESPONSE

*FIG. 4*

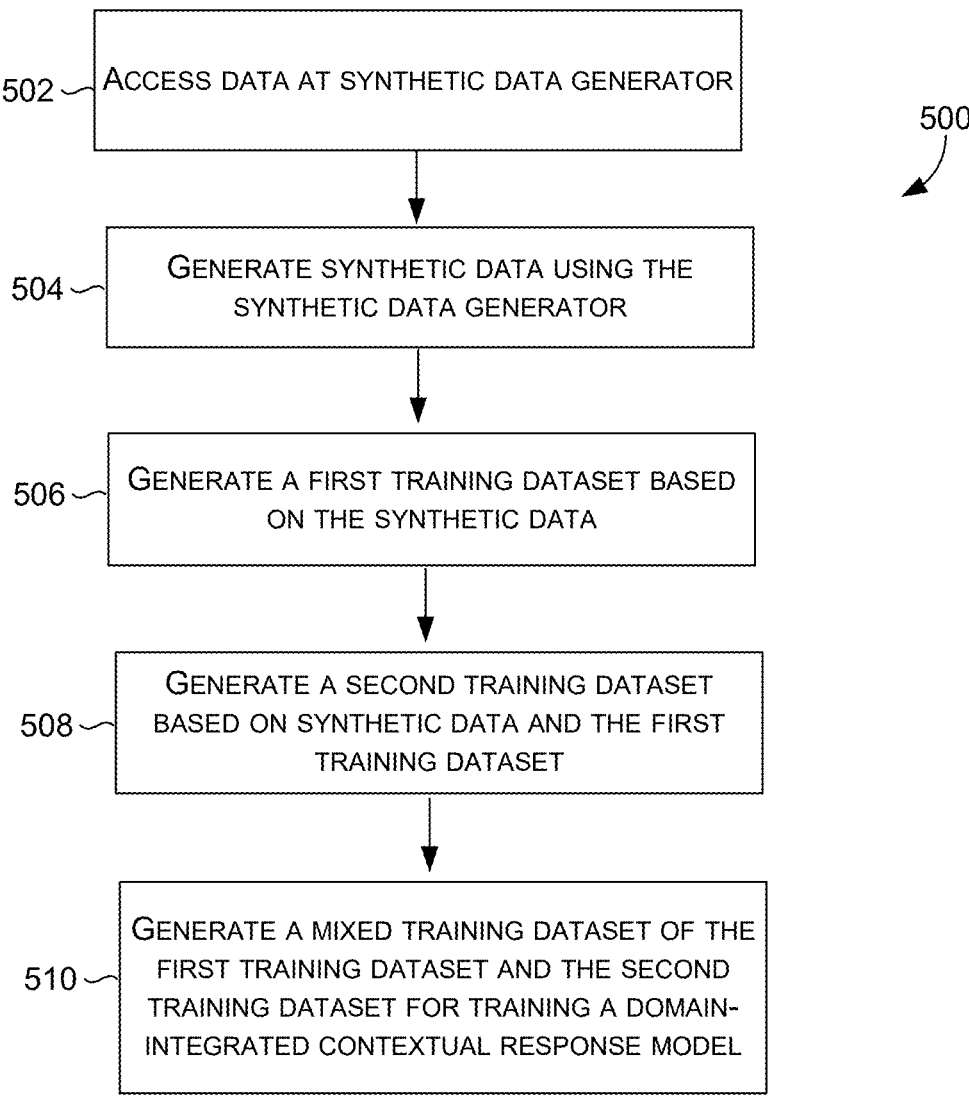

502 — ACCESS DATA AT SYNTHETIC DATA GENERATOR

504 — GENERATE SYNTHETIC DATA USING THE SYNTHETIC DATA GENERATOR

506 — GENERATE A FIRST TRAINING DATASET BASED ON THE SYNTHETIC DATA

508 — GENERATE A SECOND TRAINING DATASET BASED ON SYNTHETIC DATA AND THE FIRST TRAINING DATASET

510 — GENERATE A MIXED TRAINING DATASET OF THE FIRST TRAINING DATASET AND THE SECOND TRAINING DATASET FOR TRAINING A DOMAIN-INTEGRATED CONTEXTUAL RESPONSE MODEL

DOMAIN-INTEGRATED CONTEXTUAL RESPONSE ENGINE IN AN ARTIFICIAL INTELLIGENCE SYSTEM

BACKGROUND

Users rely on Artificial Intelligence (AI) systems to efficiently retrieve and synthesize relevant information, generation insightful responses to their queries for informed decision making. An AI system is a platform designed to perform tasks that typically require human intelligence, such as understanding language, recognizing patterns, and making decisions, often through learning from data. In particular, it can analyze large datasets to identify trends and provide insights that assist in strategic planning. For example, an AI system can be a virtual assistant that understands spoken commands, manages schedules, and provides information by processing natural language input. An AI system can incorporate a Retrieval-Augmented Generation (RAG) framework as a transformative tool for organizations, enhancing knowledge management and decision-making. RAG features a comprehensive knowledge base sourced from internal and external data, allowing for quick and efficient information retrieval. When users pose questions, the AI system utilizes advanced algorithms to filter and rank relevant content.

SUMMARY

Various aspects of the technology described herein are generally directed to systems, methods, and computer storage media for, among other things, providing domain-integrated contextual response management using a domain-integrated contextual response engine in an artificial intelligence (AI) system. An AI system supports generating answers to queries by retrieving relevant information from its knowledge base and using natural language processing to synthesize and articulate coherent, contextually appropriate responses. Domain-integrated contextual response management is a systematic approach that combines specific industry knowledge with contextual understanding to generate accurate and relevant responses to user queries. By leveraging data from various sources within a particular domain, it ensures that the responses are not only informed by general information but also tailored to the nuances and specific needs of that field. Domain-integrated contextual response management further includes fine-tuning models for Retrieval-Augmented Generation (RAG) tasks using customer-specific data based on a two-fold approach involving skill distillation and knowledge distillation (i.e., skill distillation from a more powerful model like Large Language Model "LLM" and knowledge distillation from domain-specific data). Domain-integrated contextual response management includes creating a synthetic dataset (e.g., a first training dataset and a second training dataset) that enables smaller models (e.g., domain-integrated contextual response models) to effectively manage tasks (e.g., RAG tasks) while incorporating domain-specific knowledge. Domain-integrated contextual response management ensures that the domain-integrated contextual response models can retrieve relevant information, support citations, and decline out-of-domain (OOD) questions.

Conventionally, AI systems are not configured with a comprehensive computing logic and infrastructure to efficiently and effectively respond to queries with domain-specific data having accurate (e.g., internal client) context. One common issue is the conventional AI system's inability to effectively integrate customer-specific or domain-specific knowledge. Without targeted fine-tuning, models tend to rely heavily on their pre-trained knowledge, which may not be applicable to specialized domains. This often results in inaccurate or irrelevant answers, as the model may struggle to distinguish between its pre-trained knowledge and the retrieved information. Another significant limitation is the model's tendency to generate hallucinated answers-statements that appear correct but are not supported by the provided or retrieved documents. This is particularly problematic when the retrieved data is incomplete or noisy, as the model might fail to recognize the gaps in its understanding.

In addition, conventional AI systems often have difficulty handling out-of-domain (OOD) questions, leading them to attempt answers based on irrelevant or insufficient information. Without mechanisms to decline such questions or provide accurate responses, users are left with unreliable results. These AI systems lack proper citation mechanisms, making it hard for users to trace the source of the information. This lack of transparency can undermine trust in the model's output, especially in enterprise settings where accuracy and accountability are fundamental. For example, using an AI chatbot without fine-tuning on customer-specific data may provide outdated or generic responses, leading to confusion when users inquire about new features. Additionally, chatbots struggle with out-of-domain questions, often attempting to answer with irrelevant information, which can further mislead users. The absence of citation mechanisms also prevents users from verifying the accuracy of the information, diminishing trust in the system.

A technical solution—to the limitations of conventional AI—can include providing domain-integrated contextual response resources via an AI system that supports domain-integrated contextual response management in the AI system. The domain-integrated contextual response resources facilitate the efficient fine-tuning and functionality of AI models (i.e., a domain-integrated contextual response model). The domain-integrated contextual response resources enhance Retrieval-Augmented Generation (RAG) tasks by combining skill distillation from a more powerful model (e.g., a Large Language Model "LLM") with knowledge distillation from domain-specific data. The domain-integrated contextual response resources (e.g., a synthetic data generator engine) that support creating a synthetic dataset (i.e., a first training dataset and a second training dataset) that allows smaller models to efficiently retrieve and process relevant information while incorporating specific domain knowledge, thereby improving their ability to handle in-domain queries and manage out-of-domain questions. The domain-integrated contextual response resources support an implementation framework built on data resources, operational resources, and interface resources.

In operation, in a first embodiment, synthetic data comprising questions is accessed. The synthetic data is generated based on a synthetic data generator engine. The questions include in-domain questions and out-of-domain questions. A first training dataset is generated. Generating the first training dataset is based on answering in-domain questions and out-of-domain questions in the synthetic data. Answering the in-domain questions and the out-of-domain questions is based on citation-and-filtration operations that provide citations for the in-domain questions and decline answering out-of-domain questions. A second training dataset is generated. Generating the second training dataset is based on one or more paraphrased versions of the questions in the synthetic data. A domain-integrated contextual response is trained based on the first training dataset and the second training dataset.

In a second embodiment, a query for a client associated with artificial intelligence (AI) agent is communicated. Based on communicating the query, a response associated with the query is received. The response is generated based on a domain-integrated contextual response model that is trained using a synthetic data generator engine, a first training dataset, a second training dataset, and citation-and-filtration operations. The first training dataset is generated based on questions including in-domain questions and out-of-domain questions and the second training dataset is generated based on paraphrased versions of the questions. The citation-and-filtration operations provide citations for the in-domain questions and decline answer out-of-domain questions. Display of the response is caused.

In a third embodiment, data is accessed at a synthetic data generator engine. Synthetic data is generated using the synthetic data generator engine. A first training dataset is generated based on the synthetic data. A second training dataset is generated based on the synthetic data and the first training dataset. A mixed training dataset of the first training dataset and the second training dataset is generated for training and fine-tuning a domain-integrated contextual response model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 3 provides a first exemplary method of providing domain-integrated contextual response management using a domain-integrated contextual response engine, in accordance with aspects of the technology described herein;

FIG. 4 provides a second exemplary method of providing domain-integrated contextual response management using a domain-integrated contextual response engine, in accordance with aspects of the technology described herein;

FIG. 5 provides a third exemplary method of providing domain-integrated contextual response management using a domain-integrated contextual response engine, in accordance with aspects of the technology described herein;

DETAILED DESCRIPTION

Overview

Figure 1A:
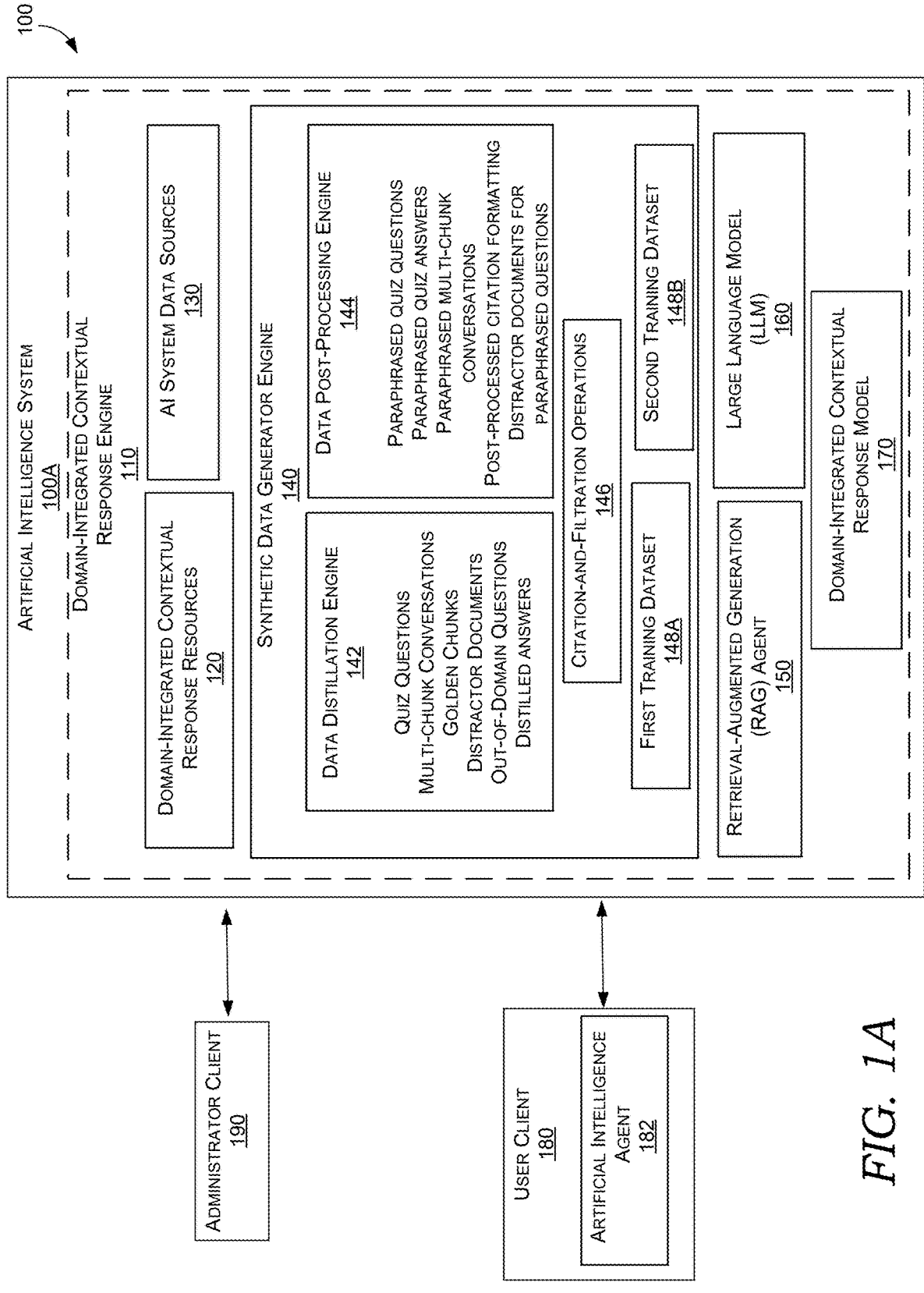
FIG. 1A is a block diagram of an exemplary AI system including a domain-integrated contextual response engine, in accordance with aspects of the technology described herein.

An AI system is a platform designed to perform tasks that typically require human intelligence, such as understanding language, recognizing patterns, and making decisions, often through learning from data. In particular, it can analyze large datasets to identify trends and provide insights that assist in strategic planning. AI system can be a type of AI agent (e.g., such as an AI assistant, including AI assistants like Microsoft COPILOT, IBM Watson Assistant, Salesforce Einstein, OpenAI ChatGPT, and Rasa) that can be deployed in a computing environment to query. By way of illustration, an AI-based digital assistant uses artificial intelligence techniques like natural language processing and machine learning to understand and respond to user queries. When a user submits a question, the assistant processes the language to interpret the intent, retrieves relevant information from its knowledge base or external sources, and generates a coherent, contextually appropriate response in natural language. This enables the assistant to provide accurate and helpful information or perform tasks efficiently, mimicking human-like interaction.

Conventionally, AI systems are not configured with a comprehensive computing logic and infrastructure to efficiently and effectively respond to queries with domain-specific data having accurate (e.g., internal client) context. By way of context, task-specific fine-tuned models are becoming more prevalent because these models enable controlling outputs without the need for prompt engineering. Retrieval-Augmented Generation (RAG) is a method in artificial intelligence that combines retrieval and generative processes. It involves retrieving relevant information from an external database or knowledge source and then using that information to generate contextually accurate and informative responses. In a typical RAG model, the system first identifies and fetches relevant documents or data based on a user query. It then integrates this retrieved content into its generative model to produce more accurate and contextually rich outputs. This approach enhances the model's ability to provide detailed, fact-based answers while maintaining the fluidity and coherence of natural language generation. RAG is particularly useful in scenarios where up-to-date information is crucial, such as in customer support, research, and various specialized fields like healthcare and law. For example, Retrieval-Augmented Generation in Large Language Models (LLMs) enables answering questions on an organization's or user's private knowledge source.

To effectively utilize RAG, careful prompt crafting is essential. This involves creating prompts that instruct the model to rely solely on the retrieved information, minimizing any use of its internal knowledge. For instance, a prompt might read: "Based on the following document, answer the question without using any external knowledge: [Insert Retrieved Document]. What are the side effects of Drug X?" In this case, the model is directed to focus exclusively on the provided document, ensuring that its response is grounded in the specific information available rather than general knowledge. Incorporating citations into the generated responses adds another layer of credibility. A response might look like this: "The side effects of Drug X include nausea and headache (Source: Document A, Page 2)." This allows users to verify the information and understand its source.

Moreover, effective prompting should also manage out-of-domain questions by instructing the model to decline to answer when the retrieved content lacks relevant information. For example, the prompt could state: "If the retrieved document does not mention the dosage of Drug Y, please respond with 'I cannot provide information about Drug Y's dosage based on the available documents.'" This prevents the model from fabricating an answer, ensuring the reliability of the information it provides.

Achieving these outcomes often requires longer prompts that are meticulously crafted to direct the model's focus. A comprehensive prompt might be: "Using only the information from the following retrieved document, respond to the question. Do not use any information from your training data. Also, provide citations for your answers, and if the document does not contain the information, clearly state that you cannot answer. Document: [Insert Retrieved Document]. Question: What is the recommended dosage for Drug Z?" In some cases, multiple interactions with the language model may be necessary. The process could involve a first call to retrieve documents about Drug Z, followed by a second call that uses a tailored prompt based on those results to answer a specific question. As illustrated, effective implementation of RAG in domain-specific contexts (e.g., pharmaceutical sales) hinges on detailed prompt crafting that ensures the model uses only the retrieved content, includes appropriate citations, and knows when to refuse to answer.

While Retrieval-Augmented Generation (RAG) is a powerful approach, there are two key use cases where it can fall short. First, noisy retrieval, in this scenario, the relevant information is indeed present in the user's data source, but it fails to be retrieved due to suboptimal search performance. This can occur for a few reasons. For instance, if a user asks a vague question, the retrieval process may return irrelevant documents. For example, a user queries, "What are the benefits of Drug X?" If the retrieval system is not finely tuned, it might pull documents that discuss Drug X's side effects instead, leading to irrelevant information. Additionally, for broader queries, such as requests for summarization, the required knowledge might not appear in the top K retrieved documents. In such cases, relying solely on RAG may not provide the comprehensive insights the user seeks, necessitating further refinement of the retrieval strategy or additional context from the user.

Second, inaccurate instruction following, here the challenge arises from the complexity of the instruction sets required to enable all the desired features of RAG. As these instructions grow in size and complexity, smaller models, like GPT-3.5-turbo, may struggle to follow them effectively. For example, a detailed prompt might instruct the model: "Using only the information from the following retrieved documents, answer the question. Do not use any information from your training data. Provide citations for your answers, and if the document does not contain the information, clearly state that you cannot answer." The model may find it difficult to adhere to all these conditions simultaneously, leading to incomplete or inaccurate responses. Thus, while RAG is an effective approach for generating responses based on retrieved information, it can struggle with noisy retrieval and challenges in instruction following. To enhance performance, users may need to refine their retrieval strategies and consider the trade-offs between model capabilities and operational costs. For instance, when using RAG to answer a specific query, it might retrieve irrelevant documents that confuse the response, leading to inaccuracies. Users can enhance results by implementing more precise retrieval strategies, such as filtering sources for reliability, while also considering the associated costs of these optimizations (e.g., increased computational resources or longer processing times). As such, a more comprehensive AI system—with an alternative basis for performing domain-integrated contextual response management—can improve computing operations and interfaces for artificial intelligence systems.

Description of Technical Solution

At a high level, a domain-integrated contextual response engine is provided to efficiently fine-tune models for Retrieval-Augmented Generation (RAG) tasks using customer-specific data. The domain-integrated contextual response engine is based on a two-fold approach that involves skill distillation from a Large Language Model (LLM) (e.g., GPT-4) and knowledge distillation from domain-specific data. The domain-integrated contextual response engine creates a synthetic dataset (including a first training dataset and a second training dataset) that enables a domain-integrated contextual response model (e.g., smaller models, such as GPT-3.5) to effectively handle the RAG task while incorporating domain-specific knowledge. The domain-integrated contextual response engine ensures that the domain-integrated contextual response model can retrieve relevant information, support citations, and decline out-of-domain (OOD) questions.

In building an effective smaller model using synthetic data, the training process can be based on synthetic data including a first training dataset and the second training dataset in a data distillation stage and a data post-processing stage, respectively. In this context, synthetic data refers to artificially generated data that mimics real-world inputs and interactions but is created through automated processes or simulations rather than being collected directly from users or natural sources. This data can include different types of data (e.g., quiz answers, multi-chunk conversations, paraphrase questions, the first training dataset, and the second training dataset).

The first training dataset in the data distillation stage focuses on distilling knowledge from an LLM (e.g., via an LLM RAG agent) using core elements like quiz questions, multi-chunk conversations, and both in-domain and out-of-domain scenarios. This first training dataset is used for teaching the model fundamental skills such as retrieving relevant documents, generating accurate responses, and recognizing when a query falls outside its knowledge base. The second training dataset in the data post-processing stage concentrates on post-processing and refining the model. By introducing paraphrased questions, refining citation formats, and maintaining distractor documents, this dataset ensures that the model becomes adept at handling varied phrasings and citing documents in a user-friendly way. This progressive training approach-first instilling core RAG and factual reasoning skills, and then enhancing the model's flexibility and generalization through paraphrasing and post-processing.

By way of illustration, data distillation stage can include quiz questions that are generated for each chunk (i.e., data chunk, data segment, or document) of a knowledge base (e.g., customer-specific knowledge base). These questions are designed to cover key knowledge areas, ensuring that the model learns to answer questions such as "What are the system requirements?" or "How do you troubleshoot installation issues?" Complex conversations that span multiple document chunks are simulated. These conversations are crafted to mimic real-world interactions where users need information from different parts of the knowledge base. An example might involve a query combining installation instructions and troubleshooting tips.

Random irrelevant or partially relevant documents are added alongside golden documents in the context. A golden document refers to a key piece of information that serves as the correct reference for answering specific queries or tasks within a dataset. It represents the most accurate and relevant source of knowledge needed to respond to user questions effectively. This inclusion teaches the model to focus on the correct information while filtering out distractions.

Out-of-domain questions, derived from unrelated knowledge sources (e.g., public documentation), are incorporated to train the model to identify when it cannot provide an answer and should refuse to respond. The smaller model is trained to mimic LLMs responses, learning to provide accurate citations and to refuse to answer out-of-domain questions. This stage involves distilling LLM's behavior into the smaller model.

Moreover, in the data post-processing stage, each original quiz question is rephrased to create paraphrased versions, which helps the model recognize the same question asked in different ways. For example, "What are the system requirements?" might be transformed into "What specs are needed for installation?" Paraphrased questions replace the original ones in the dataset, along with modifications to distractor documents, testing the model's ability to handle varied question formulations while identifying the correct information. The citations provided by the model are refined to be clearer and more user-friendly. Indexed citations like [doc2] are substituted with document titles such as [Internal_doc=INSTALLATION_GUIDE], ensuring that the model's citations are understandable and informative. Paraphrased conversations involving multiple document chunks are utilized to reinforce the model's ability to handle various question formulations while still referencing the correct documents, ensuring accurate responses across different phrasings.

Additionally, the technical solution involves Skill Distillation (SD) and Knowledge Distillation (KD)—SD involves training a smaller model to replicate the behaviors and capabilities of a more powerful model (like GPT-4). This includes specific features necessary for RAG tasks, such as citing sources and recognizing when to decline answering out-of-domain questions—and KD focuses on transferring domain-specific knowledge from the training dataset to the smaller model, enabling it to generate accurate answers based on its understanding of the target domain. SD and KD are complementary processes that rely on creating a synthetic dataset to develop a smaller model's capabilities for RAG tasks. The synthetic dataset not only provides the varied training examples needed for skill acquisition but also supplies the factual knowledge essential for answering questions accurately. Together, they create a comprehensive learning framework that enables the smaller model to handle complex real-world queries effectively.

For skill distillation, synthetic dataset serves as the training ground for the smaller model to learn these skills. By generating diverse question-answer pairs and realistic conversational scenarios, the dataset allows the smaller model to practice the skills it needs to master, including reasoning and contextual understanding.

For knowledge distillation, synthetic dataset is specifically designed to include both in-domain questions and distractor documents. This setup allows the model to learn how to provide accurate responses even when relevant information is lacking in the retrieved documents. Through knowledge distillation, the model internalizes facts and insights from the dataset, enhancing its ability to answer queries correctly.

Creating the synthetic dataset process involves generating artificial data that mimics real-world interactions, including question-answer pairs, context documents, and out-of-domain inquiries. The synthetic dataset creation process is essential for both SD and KD because it supports skill acquisition and facilitates knowledge transfer. In particular, by incorporating various types of questions (including quizzes and multi-chunk scenarios), the synthetic dataset allows the smaller model to practice and refine its RAG skills through SD—and the synthetic dataset also provides the necessary knowledge base from which the smaller model learns through KD. By exposing the model to both in-domain and out-of-domain questions, it learns to differentiate between relevant and irrelevant information, enhancing its contextual understanding.

Operationally, smaller model can effectively handle RAG tasks because it has been fine-tuned using a distillation process that incorporates two key abilities: SD and KD. With reference to SD, the smaller model (e.g., GPT-3.5) is trained to mimic the behavior of a more powerful model LLM (e.g., GPT-4) in RAG tasks, such as generating answers with citations and handling complex queries. Through this training, the smaller model learns how to retrieve information, generate responses with proper citation, and refuse to answer out-of-domain (OOD) questions—all essential skills for RAG tasks. This enables the smaller model to perform similarly to a larger, more powerful model in terms of handling retrieval and generation.

With reference to KD, the smaller model is fine-tuned not only to mimic retrieval behavior but also to absorb domain-specific knowledge. This allows the model to integrate both the retrieved documents and its internalized domain knowledge during RAG tasks. This means that even when the retrieved documents are incomplete or insufficient, the smaller model can still generate relevant answers based on its learned knowledge, making it more effective in answering questions within the target domain.

Efficient Fine-Tuning is employed (e.g., using techniques like LoRA "Low-Rank Adaptation"), where the fine-tuning process for the smaller model is efficient, requiring only a few thousand data samples to adapt the model to customer-specific data without overfitting or losing generalization capabilities. In this way training the smaller model contemplates fine-tuning the model to ensure it retains its RAG abilities while being lightweight and responsive. In this way, through a combination of efficient fine-tuning and distillation of skills and knowledge from a more powerful model, the smaller model becomes capable of handling RAG tasks effectively, even with fewer resources.

Moreover, citation-and-filtration operations are integral to both Skill Distillation (SD) and Knowledge Distillation (KD) in the context of fine-tuning models for Retrieval-Augmented Generation (RAG) tasks. Citation-and-filtration operations refer to the mechanisms incorporated into the training and inference processes of a fine-tuned model for Retrieval-Augmented Generation (RAG) tasks, enabling the model to both cite relevant sources of information and filter out irrelevant or out-of-domain (OOD) questions. These operations aim to enhance the reliability, transparency, and accuracy of the model's outputs.

With reference to Skill Distillation, for citation generation, during the skill distillation process, the smaller model is trained to generate responses with indexed citations (e.g., [doc1], [doc2]) based on retrieved documents. This teaches the model to attribute information correctly, enhancing its ability to support answers with verifiable sources. The smaller model learns how to format citations appropriately, enabling it to mimic the citation style of the more powerful model (like GPT-4). This skill is essential for RAG tasks, where the model needs to provide reliable references for the information it generates.

For filtration of out-of-domain questions, the skill distillation process also involves training the model to refuse to answer out-of-domain (OOD) questions. This is part of the filtration operations, where the model learns to identify when a question does not align with its domain expertise or when the retrieved documents are irrelevant. By understanding the boundaries of its knowledge, the smaller model can filter out inappropriate queries and avoid generating misleading or incorrect responses, thereby improving the overall reliability of its outputs.

With reference to Knowledge Distillation (KD), for incorporation of domain knowledge, knowledge distillation involves teaching the smaller model to learn facts and information from a customer-specific dataset. This includes the ability to generate answers based on both the retrieved documents and its learned knowledge. Citation operations come into play here as the model must effectively combine its internalized knowledge with retrieved content to provide accurate responses, often citing sources from the retrieval process.

For reference and filtering, the ability to generate direct citations (e.g., [Internal_doc=DOC_TITLE]) during the knowledge distillation process allows the smaller model to reference customer-specific data directly. This enhances the model's capability to provide contextualized answers while filtering out incorrect or irrelevant data that may arise from the retrieval process. By reinforcing this ability during training, the model becomes adept at distinguishing between relevant information and noise, effectively filtering out distractions and honing in on pertinent content. In this way, the citation-and-filtration operations are closely tied to both Skill Distillation (SD) and Knowledge Distillation (KD) as they enhance the smaller model's ability to accurately cite sources, filter out irrelevant queries, and effectively integrate domain-specific knowledge into its responses. Together, these operations contribute to the model's overall performance in RAG tasks, ensuring that it can generate reliable, contextually appropriate answers based on the information it retrieves.

Advantageously, the embodiments of the present technical solution include several inventive features (e.g., operations, systems, engines, and components) associated with an artificial intelligence system having a domain-integrated contextual response engine. The domain-integrated contextual response engine supports fine-tuning a smaller AI model on domain-specific data for Retrieval-Augmented Generation (RAG) tasks by utilizing skill and knowledge distillation from a more powerful mode. The domain-integrated contextual response engine supports creating synthetic data through techniques such as generating question-answer pairs, incorporating distractor documents, and introducing out-of-domain question. In particular, the synthetic data is used to generate training datasets (e.g., a first training dataset and a second training dataset) to train the model in effectively retrieving relevant information and accurately responding to inquiries while declining irrelevant ones.

For example, a user logs into a customer support platform and types in a query: "Can you explain the features of your latest software update?" The fine-tuned AI model processes the input, utilizing its Retrieval-Augmented Generation (RAG) capabilities to search through a client-specific database, which includes relevant documents detailing the software features. Upon retrieving the pertinent information, the model generates a concise and informative response, citing specific sections from the documentation. Additionally, it recognizes that the user's question is directly within the domain, allowing it to provide a comprehensive answer without declining to respond. The user receives a well-structured reply that not only answers their query but also includes references for further reading, enhancing their understanding of the software update.

Example Systems and Resources

Figure 1B:
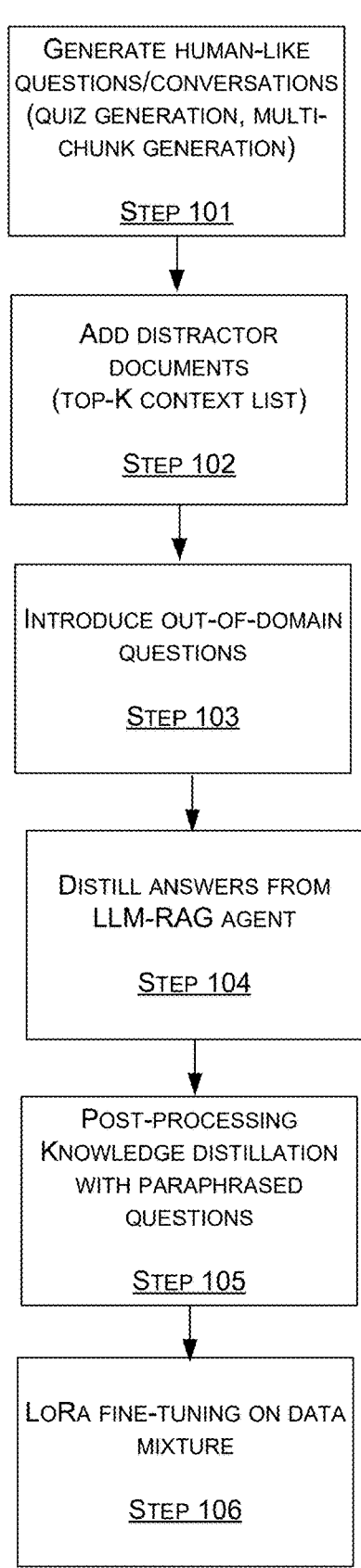
FIGS. 1B and 1C are domain-integrated contextual response management schematics associated with a domain-integrated contextual response management workflow of a domain-integrated contextual response engine, in accordance with aspects of the technology described herein.

Aspects of the technical solution can be described by way of examples and with reference to FIGS. 1A-1B. FIG. 1A illustrates a cloud computing environment (system) 100, artificial intelligence system 100A; domain-integrated contextual response engine 110, domain-integrated contextual response resources 120, AI system data sources 130, synthetic data generator engine 140 including data distillation engine 142 and data post-processing engine 144, citation-and-filtration operations 146, first training dataset 148A and second training dataset 148; retrieval-augmented generation (RAG) agent 150, Large Language Model ("LLM") 160; and domain-integrated contextual response model 170; user client 180 including artificial intelligence agent; and administrator client 190.

The cloud computing system 100 provides a computing environment for implementing artificial intelligence system 100A. Artificial intelligence system 100A can analyze large datasets and provide responses to queries. The artificial intelligence system 100A supports generating answers to queries by retrieving relevant information from its knowledge base and using natural language processing to synthesize and articulate coherent, contextually appropriate responses. User client 180 engages with the artificial intelligence system 100A-via an artificial intelligence agent 182, to primarily to retrieve information, submit specific queries, and receive detailed responses, often using features like search or document retrieval. For example, the user client 180 can interact with both in-domain and out-of-domain content through a user-friendly interface, which may include access to quizzes, conversations, or FAQs for learning purposes.

Administrator client 190 handles the backend tasks, such as managing datasets, configuring the retrieval-augmented generation (RAG) system, and performing updates or fine-tuning on the model. Administrator client 190 can support data ingestion, including uploading new knowledge base documents, monitoring system performance, adjusting parameters for document citation formats, and ensuring the model's output aligns with current requirements. Administrators also handle access control and may update the knowledge base with new golden documents and modify paraphrased questions to refine training datasets.

Domain-integrated contextual response engine 100 provides domain-integrated contextual response management for generating responses that are not only informed by general information but also tailored to the nuances and specific needs of that field using domain-integrated contextual response resources 120. The domain-integrated contextual response resources 120 provide data, operations, and interfaces that enable providing domain-integrated contextual response management of the domain-integrated contextual response engine 110. The domain-integrated contextual response resources (e.g., data resources) include synthetic datasets that simulate real user interactions and domain-specific knowledge bases containing relevant information such as FAQs and manuals. Variations of questions and distractor documents help the model distinguish between relevant and irrelevant information.

The domain-integrated contextual response resources (e.g., operational resources) facilitate model training and performance through automated training pipelines and effective retrieval mechanisms, allowing for the efficient fetching of relevant documents. Reasoning agents further analyze the usefulness of retrieved information, guiding the answer generation process.

The domain-integrated contextual response resources (e.g., interface resources) enable user interaction with the AI system, encompassing user interfaces like chatbots and web applications, as well as Application Programming Interfaces (APIs) that support communication between software components. By integrating data, operational, and interface resources, the solution ensures effective training and user interaction, ultimately enabling robust AI performance tailored to diverse needs.

AI system data sources 130 refers to the various repositories or collections of information utilized to generate, enrich, and validate the training datasets. AI system data sources 130 can include structured databases, unstructured text documents, public documentation and existing knowledge bases that provide relevant context and factual content for developing the model's understanding and response capabilities. AI system data sources 130 can include customer-specific data, the customer-specific data refers to tailored information and content derived from a particular customer's knowledge base, including unique documents, FAQs, and support materials relevant to that customer's products or services. Customer-specific data is used to train models (e.g., fine-tuning models) to provide accurate and context-aware responses that address the specific needs and queries of the customer's users. For example, a tech company's knowledge base, customer-specific data may include proprietary installation manuals, troubleshooting guides, and user feedback forms specific to their software products, which are utilized to generate training datasets for a customer support chatbot.

AI system data sources 130 can include documents and document chunks, where a document refers to a complete unit of information that provides comprehensive coverage of a particular topic within the knowledge base. This can be in various formats, such as text files, PDFs, or web pages, containing structured or unstructured information. For example, a document might consist of the entire user manual for a software product, including sections on installation, troubleshooting, and feature descriptions. The document serves as a primary source of knowledge from which specific information is extracted to answer user queries.

A document chunk refers to smaller segment or portion of a larger document that is isolated for focused processing and analysis. Each chunk typically contains a specific piece of information or a related set of information that can be utilized to answer particular questions. For instance, in the context of a user manual, a document chunk might include just the section on the installation process, while another chunk might cover troubleshooting steps. By breaking the document into manageable chunks, the AI system 100A can more effectively retrieve relevant information and process user queries based on specific topics without needing to analyze the entire document at once.

Domain-integrated contextual response engine 110 enables skill distillation (SD), knowledge distillation (KD), and dataset generation and model training. With skill distillation, domain-integrated contextual response model 170

(e.g., GPT-3.5) is trained to replicate the behavior of a LLM model 160 (e.g., GPT-4) in RAG tasks (e.g., RAG agent 150), incorporating features like citations and answer refusal for OOD questions, while also learning reasoning skills. Knowledge distillation, includes teaching the domain-integrated contextual response model to retain domain-specific knowledge, enabling the domain-integrated contextual response model to answer in-domain questions even when retrieved documents are incomplete or incorrect. Finally, dataset generation and model training includes using synthetic data, RAG agents, and LoRA (Low-Rant Adaptation) fine-tuning to train the domain-integrated contextual response model efficiently, ensuring generalization and minimizing overfitting.

Synthetic data generator 140 provides data distillation engine 142 and data post-processing engine 144 that support generating synthetic data including a first training dataset 148A and a second training dataset 148B. The first training dataset 148A is composed of all data related to LLM distilled knowledge, including generated questions, multi-chunk conversations, and in-domain/out-of-domain differentiation, which are considered essential for teaching the smaller model retrieval-augmented generation (RAG) skills and factual reasoning. The second training dataset 148B is composed of the post-processed data, which includes paraphrased questions, distractor documents, and specific modifications to citation formatting. This stage is focused on refining the model's ability to handle varied phrasings and cite documents properly.

Data distillation engine 142 supports training the domain-integrated contextual response model 170 using LLM's outputs as a teacher, concentrating on core knowledge and skills such as citations, RAG, and out-of-domain refusal. Quiz generation for each document chunk a database, quiz questions (e.g., approximately 10 quiz questions) are generated. These questions are intended to cover key knowledge areas. Multi-chunk conversation simulation including conversations that are generated, the conversations require multiple document chunks to provide answers. These conversations are designed to simulate real-world customer support interactions where users query multiple sections of the knowledge base.

Addition of distractor documents, include for each quiz question or conversation, random distractor documents are added from the same domain, creating a context list of the top five relevant and irrelevant documents. Domain-integrated contextual response model training is aimed to differentiate between the correct (golden) chunks and unrelated content. Out-of-domain question generation includes generating random out-of-domain questions that are generated using a public domain (e.g., public documentation). These questions are paired with in-domain documents, teaching the model to refuse to answer when the question is deemed irrelevant to the knowledge base.

During LLM distillation, the domain-integrated contextual response model 170 that is trained by generating answers using RAG agent 150. The distilled knowledge is intended to teach the model to cite relevant documents and recognize out-of-domain queries by mimicking LLM's behavior.

Data post-processing engine 144 supports training the domain-integrated contextual response model 170 based on paraphrasing and citation refinement, enhancing the model's ability to generalize, cite correctly, and handle varied phrasing in user queries. Question paraphrase generation includes paraphrases that are generated for each quiz question. This is done to ensure the domain-integrated contextual response model 170 can understand and answer the same question, even when it is phrased differently. Post-Processing with paraphrase questions includes for each original data sample, the questions are replaced with their paraphrased counterparts. In a quiz or multi-chunk conversation, the paraphrased questions are used instead of the original ones. Distractor documents may also be modified to test the model's robustness. Citation reformation includes citations generated during distillation are modified to be more user-friendly, replacing indexed citations (e.g., [doc2]) with descriptive document titles (e.g., [Internal_doc=INSTALLATION_GUIDE]). This is aimed at ensuring the domain-integrated contextual response model 170 provides user-friendly and informative citations when delivering answers. Mixed paraphrased conversations for knowledge distillation paraphrase questions and answers are utilized in complex conversation simulations to reinforce the model's ability to understand varied phrasing while preserving the integrity of the response. This enables the domain-integrated contextual response model 170 to handle different ways of asking the same question while still referencing the correct golden chunks.

Citation-and-filtration operations 146 refer to the mechanisms incorporated into the training and inference processes of a fine-tuned model for Retrieval-Augmented Generation (RAG) tasks, enabling the model to both cite relevant sources of information and filter out irrelevant or out-of-domain (OOD) questions. These citation-and-filtration operations 146 aim to enhance the reliability, transparency, and accuracy of the domain-integrated contextual response model 170 outputs.

Citation operations ensures that domain-integrated contextual response model 170, when generating answers, provides explicit references to the sources of the retrieved information. During training, the model learns to tag parts of its responses with indexed citations (e.g., [doc1], [Internal_doc=DOC_TITLE]), linking the information in the answer to specific retrieved documents or internal knowledge. This builds trust and transparency into the system by allowing users to trace the origins of the answer back to a specific document or dataset.

The filtration operation enables domain-integrated contextual response model 170 to recognize when a question is out-of-domain or when the retrieved documents do not contain sufficient or relevant information to answer the query. In such cases, domain-integrated contextual response model 170 is trained to decline providing an answer, often responding with phrases like "I don't know" or "This information is not available." This reduces the risk of hallucinations or incorrect answers when the model is confronted with queries beyond its trained domain or knowledge base.

Together, these operations create a model that not only generates responses but does so with accountability through citations and restraint through filtration, addressing the limitations of previous RAG approaches. User Query: "Can you provide the latest specifications for the Azure Virtual Machine series?" Response Process: upon receiving the query, domain-integrated contextual response model 170 first identifies it as an in-domain question related to cloud computing and Azure services. Leveraging its citation-and-filtration operations, the model initiates the RAG process to retrieve relevant documents from a curated knowledge base, which includes the latest documentation on Azure Virtual Machines.

Retrieval Step: domain-integrated contextual response model 170 queries the knowledge base and retrieves a set of documents, including product specifications, user guides, and FAQ sections specifically about the Azure Virtual Machine series. Citation Generation: As domain-integrated contextual response model 170 generates its response, it references the retrieved documents using indexed citations (e.g., [Azure_VM_Specs_Document]). This provides the user with a clear source for the information, enhancing the reliability of the answer. Answer Generation: domain-integrated contextual response model 170 which has been fine-tuned on domain-specific data, synthesizes the information from the retrieved documents to construct a comprehensive response. Domain-integrated contextual response model 170 incorporates key specifications, such as the types of virtual machines available, their performance metrics, and pricing options, while ensuring clarity and conciseness. Filtration Step: If the query had included any out-of-domain elements, such as unrelated technologies or services, the model would have effectively filtered these out, stating that it does not provide information on those topics and declining to answer irrelevant questions.

Final Response: Generated Response: "The latest specifications for the Azure Virtual Machine series include various types, such as the D series optimized for general-purpose workloads and the E series designed for heavy memory usage. For example, the D4s_v5 instance offers 4 vCPUs and 16 GiB of RAM, suitable for a wide range of applications. For more detailed information, you can refer to the [Azure_VM_Specs_Document]." This response not only addresses the user's inquiry with relevant and specific information but also reinforces the reliability of the answer through citations, showcasing the effective integration of the generator model, RAG, and the fine-tuned model within this solution.

Multiple works have attempted to address aspects of skill and knowledge distillation. Previous attempts to address aspects of skill and knowledge distillation have shown several limitations. Some approaches have focused on generating synthetic question-answer pairs for datasets, but the methods used were often not well-detailed and were tested only in limited settings, making them impractical for larger-scale applications. Additionally, while various studies explored adapting language models (LLMs) to new domains, many struggled to effectively integrate new factual knowledge, particularly when using techniques like LORA, which proved difficult to apply. Full fine-tuning or continual pre-training was often recommended instead, though these methods come with their own challenges. Furthermore, models fine-tuned on customer-specific data were found to increase hallucination, and existing techniques failed to effectively teach models how to differentiate between pre-trained, customer-specific, and retrieved knowledge, leading to unclear or inaccurate responses. This created issues with model overfitting and sensitivity to question phrasing, making it hard to extend solutions with more complex features.

A clear distinction between pre-trained knowledge and customer-specific knowledge is established by: ensuring the model responds with "I don't know" for out-of-domain questions by using distractor domains for which the model has pre-trained knowledge, preventing it from answering directly from its pre-trained knowledge; enabling responses in noisy retrieval settings by creating synthetic data variants where golden documents are replaced with distractors from the same domain; and differentiating between retrieved knowledge and customer-specific fine-tuned knowledge through citations, with the model learning to generate indexed citations (e.g., [doc1], [doc2]) for retrieved documents and directly referencing customer knowledge with a citation like [Internal_doc=DOC_TITLE]. This helps customers understand the source of the information.

Challenges in synthetic data generation are addressed through model distillation. Generating truly human-like data with required features such as citations is difficult. Therefore, complex human-like questions or conversations are generated, and responses are produced by a more powerful model, such as GPT-4 or a reasoning agent. This process is performed offline and can be slow, allowing the model to learn from a more advanced agent. This approach, similar to context distillation, prevents overfitting and reduces the complexity of data generation. Overfitting is also mitigated since the output distribution is noisy and not created through a simple human process. A new feature—reasoning before answering—can be added to the RAG framework by changing the target answer-generating agent. Offline, the agent uses documents to reason about what is useful, and GPT-4 filters the documents and answers the question based on that reasoning. By swapping the agent but keeping the generation process the same, a new feature is extracted in the fine-tuned model.

With reference to FIG. 1B, 1 FIG. 1B illustrates a domain-integrated contextual response management schematic associated with a domain-integrated contextual response management workflow. By way of example, Step 101: Generation of Human-like Questions/Conversations-Human-like questions and conversations are generated using synthetic data creation. The generation process is divided into two components: Quiz Generation: For each document chunk in the user database, approximately ten questions are created that cover various knowledge aspects of the content. For instance, if there are 10 document chunks, a total of about 100 questions will be generated. Multi-Chunk Generation: This involves creating conversations that utilize information from multiple related chunks. The objective is to mimic real-world interactions, where users may require information from various sources to form comprehensive answers.

For example, synthetic quiz questions are generated based on the company's IT support documentation. Document: "How to troubleshoot internet connectivity issues." Generated Questions: (1) "What steps can be taken to fix internet connection problems?"; (2) "What could cause a sudden loss of internet connection?"; and (3) "How is a router reset to fix connectivity issues?" Multi-chunk Generation Example: Documents: "How to reset a router" and "How to check network settings." Generated Conversation: Question: "If the internet stops working and resetting the router doesn't help, what should be done next?" Answer: "After resetting the router, network settings should be checked to ensure the device is connected to the correct network."

Step 102: Addition of Distractor Documents-Irrelevant documents (distractors) are mixed in from the same IT domain to challenge the model. To enhance the training dataset, distractor documents are added. For each generated question, random documents from the same domain are sampled to create a context list of top K documents (e.g., K=5). This step ensures the model is trained not only to recognize correct answers but also to differentiate between relevant and irrelevant information.

For example, while answering a question on "internet connectivity," distractor documents on "printer setup" or "software installation" are included. Training Example: Question: "What steps should be taken if the internet disconnects?" Context (top-5 documents): (1) "How to troubleshoot internet issues" (golden document); (2) "How to install a printer" (distractor); (3) "Software troubleshooting guide" (distractor); (4) "Resetting the router" (golden document); and (5) "How to connect to Wi-Fi" (golden document).

Step 103: Introduction of Out-of-Domain (OOD) Questions-a new dataset of out-of-domain questions is generated, utilizing the methods from Step 101 but applying them to a public domain, such as Azure documentation. For a subset of the dataset, in-domain questions are replaced with these out-of-domain questions, maintaining the context. This training method aims to teach the model to refuse answers when faced with irrelevant queries.

For example, unrelated (out-of-domain) questions are added to the dataset, such as questions about public topics (e.g., Azure documentation), while keeping the context related to IT support. OOD Example: Question: "How can a virtual machine be deployed in Azure?" Context: Documents about troubleshooting internet connectivity. Expected Answer: The model should refuse to answer because the question is out-of-domain.

Step 104: Distillation of Answers from LLM (e.g., GPT-4) RAG Agent—The in-domain and out-of-domain questions are then utilized to generate answers using a RAG agent, specifically leveraging the capabilities of a LLM RAG agent. During this step, features such as indexed citations are introduced, enabling the model to cite sources accurately based on the retrieved documents.

For example, Answers to in-domain and OOD questions are generated using a GPT-4 RAG agent. In-Domain Example: Question: "What should be done if the internet connection drops frequently?" GPT-4 Answer: "Start by resetting the router and checking the device's network settings. [doc1] [doc4]". Out-of-Domain Example: Question: "How is Kubernetes installed on Azure?" GPT-4 Answer: "This question is out of scope for this IT support system."

Step 105: Post-Processing-Knowledge Distillation with Paraphrased Questions. Paraphrased versions of existing questions are created, and the context is modified. To bolster the model's versatility, paraphrases for each question are generated. Each data sample is replicated with the original questions replaced by their paraphrased counterparts. For these paraphrased samples, distractor documents substitute the golden documents. Additionally, citation formatting is adjusted to ensure that the model learns to perform direct citations using the internal document titles.

For example, Original Question: "What should be done if the internet connection drops?" Paraphrased Question: "How can frequent internet disconnections be fixed?" For paraphrased questions, some golden documents are replaced with distractors, and the model is trained to recognize direct citations (e.g., [Internal_doc=Router_Troubleshooting]).

Step 106: LORA Fine-Tuning—The final step involves mixing the distilled data from Step 104 and the post-processed data from Step 105. This combined dataset is then used for fine-tuning the smaller model (e.g., GPT-3.5), through LORA (Low-Rank Adaptation) finetuning, ensuring that the model retains its generalization ability while learning from the synthetic data.

The original and paraphrased data are mixed, and the domain-integrated contextual response model 170 model is fine-tuned using LORA. Result: The fine-tuned domain-integrated contextual response model is capable of: answering in-domain questions accurately using retrieved documents; citing sources correctly (e.g., [Internal_doc=Network_Settings]); and refusing out-of-domain questions appropriately.

Figure 1C:
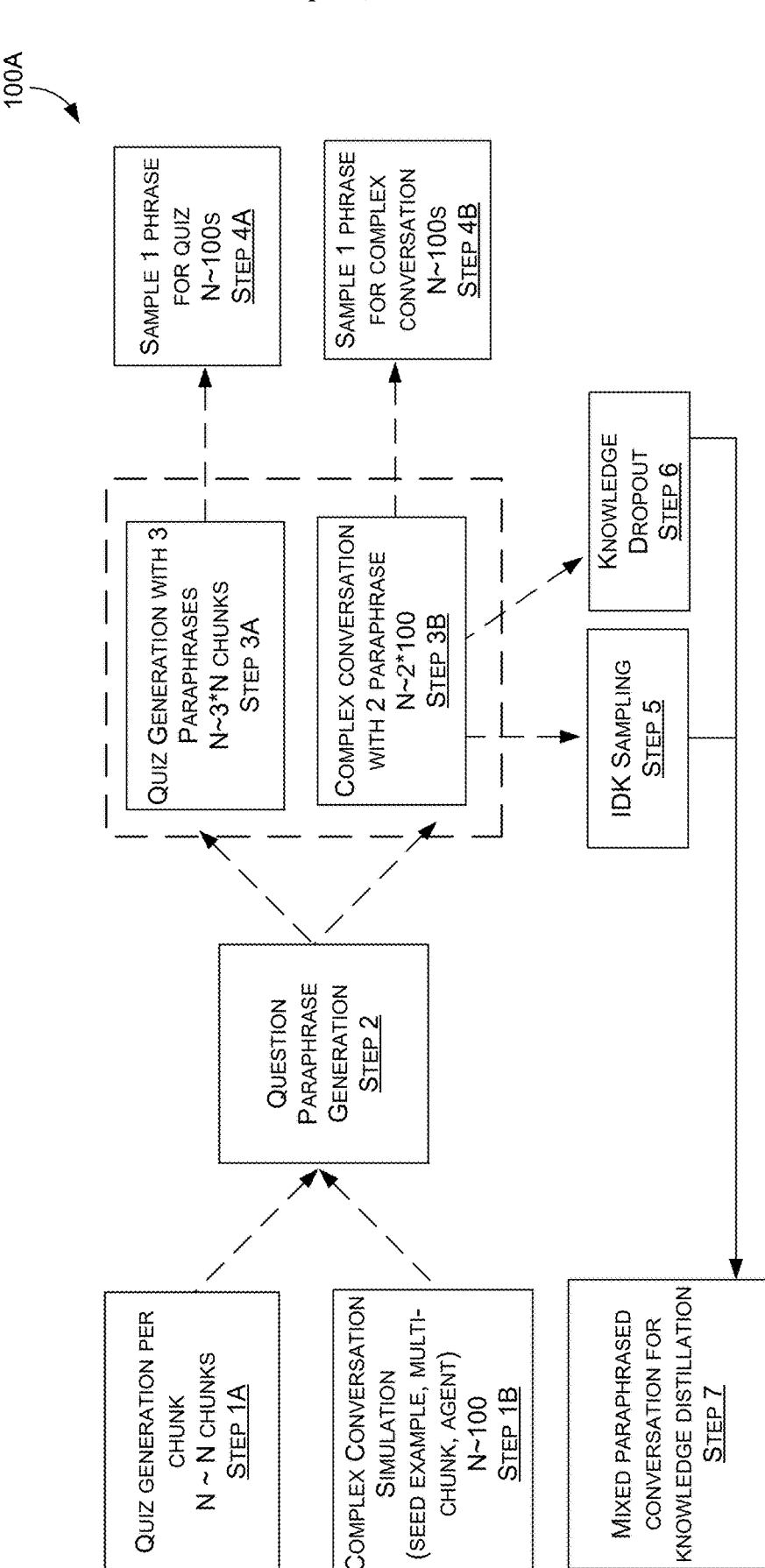

With reference to FIG. 1C, 1 FIG. 1C illustrates a domain-integrated contextual response management schematic associated with a domain-integrated contextual response management workflow (e.g., flow chart). The flow chart illustrates the comprehensive process of creating a synthetic dataset for fine-tuning an AI model focused on Retrieval-Augmented Generation (RAG) tasks. As discussed, the objective is to enhance the model's capability to accurately answer user queries within a specific domain—such as customer support in the tech industry—by simulating real-world interactions and generating diverse training examples.

The flow chart is divided into key steps, beginning with the generation of quiz questions based on document chunks and progressing through complex conversation simulations. Each step builds upon the previous one, incorporating techniques such as question paraphrasing, out-of-domain question sampling, and knowledge dropout to enrich the dataset.

By employing a structured approach to synthetic dataset creation, the flow chart encapsulates the methodologies for effectively training the model, ensuring it can retrieve relevant information, articulate coherent responses, and recognize its limitations in knowledge. Ultimately, this process lays the groundwork for deploying a robust AI solution capable of delivering accurate and contextually relevant answers to user queries.

At step 1A: Quiz Generation per Chunk (N~N Chunks). In this initial step, the process begins by generating quiz questions for each document chunk in the dataset. For every chunk of information (N), approximately ten questions are crafted that cover different knowledge aspects of that specific content. This serves to ensure comprehensive coverage of the material, enabling the model to learn specific details and context related to each chunk. By focusing on various elements of the content, the model can be trained to extract and articulate relevant information effectively.

At step 1B: Complex Conversation Simulation (Seed Example, Multi-Chunk, Agent). Once the quiz questions are generated, the next step is to simulate more complex conversations. This involves creating scenarios where users might need to refer to multiple chunks of information to formulate their questions. For example, a seed question might prompt the AI to generate a dialogue that incorporates two or more relevant document chunks, mimicking real-world interactions. This simulation helps the model understand how to synthesize responses from various sources and engage in more dynamic, human-like conversations.

At step 2: Question Paraphrase Generation. In this step, a range of paraphrases for the generated questions is created. This involves rephrasing each question in multiple ways while maintaining the original meaning. The purpose of this is to train the model to recognize and respond accurately to variations in user queries, enhancing its adaptability and robustness against different ways a question might be phrased.

At step 3A: Quiz Generation with 3 Paraphrases (N~3*N Chunks). After generating paraphrases, the process returns to quiz generation, this time incorporating the three paraphrases created for each original question. For each document chunk, three distinct paraphrased questions are generated, resulting in a total question count that is three times the number of original chunks (N). This further diversifies the dataset, providing the model with a wider variety of prompts to learn from, improving its capacity to handle various query styles.

At step 4A: Sample 1 Phrase for Quiz (N~100 s). Here, a sampling process is employed to select one question phrase from the generated quiz questions. This ensures that the training data remains manageable while still representing the diversity created in previous steps. The output from this sampling will typically consist of hundreds of quiz questions, forming a significant part of the synthetic dataset.

At step 3B: Complex Conversation with 2 Paraphrases (N~2*100). Similar to the earlier steps, this step focuses on complex conversations but with two paraphrases for each original multi-chunk scenario. This means that for each complex conversation scenario generated, two distinct rephrasings will be produced. This results in a broader array of potential user interactions and helps the model learn to navigate more nuanced dialogue contexts.

At step 4B: Sample 1 Phrase for Complex Conversation (N~100s). Just as in the quiz generation process, this step involves sampling one phrase from the generated complex conversations. The aim is to keep the training data concise while retaining its variability. The result will yield hundreds of conversation prompts that the model can utilize during training.

At step 5: IDK Sampling. In this stage, questions that the model should recognize as outside its domain knowledge (often referred to as "I don't know" or IDK scenarios) are generated. This involves creating queries that fall outside the realm of the dataset it has been trained on. By exposing the model to these situations, it learns to appropriately decline to answer irrelevant questions, thus enhancing its filtration capabilities.

At step 6: Knowledge Dropout. Knowledge dropout refers to a strategy used to reinforce the model's understanding of key concepts and facts while intentionally withholding certain information during training. This can involve omitting specific details or documents from the training set to challenge the model. As a result, the model learns to generate accurate answers even when it does not have access to all relevant information, thereby strengthening its ability to combine retrieved documents with its pre-existing knowledge.

At step 7: Mixed Paraphrased Conversation for Knowledge Distillation. In the final step, mixed paraphrased conversations are created to facilitate knowledge distillation. This involves blending the various paraphrased prompts from earlier stages to form a comprehensive training set that enhances the model's ability to draw on its learned knowledge while articulating responses. The combination of these paraphrased conversations serves to refine the model's understanding and improve its performance in real-world applications, particularly in complex query scenarios. Together, these steps form a holistic approach to dataset creation, ensuring that the resulting synthetic dataset is rich, diverse, and capable of supporting the fine-tuning of AI models for effective RAG tasks.

Figure 2:
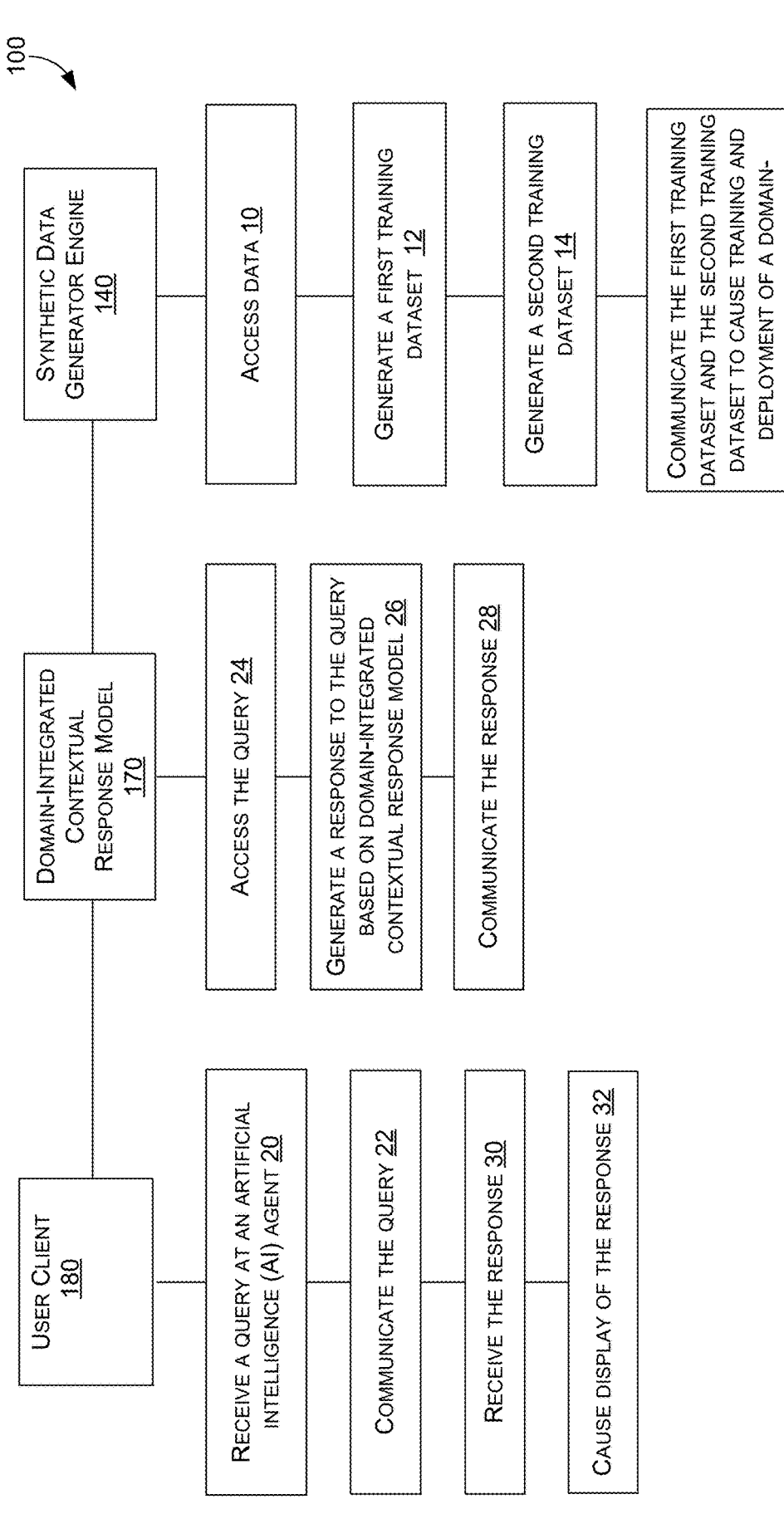
FIG. 2 is a flow diagram associated with an exemplary AI system including a domain-integrated contextual response engine, in accordance with aspects of the technology described herein.

With reference to FIG. 2, FIG. 2 illustrates a cloud computing system 100 having user client 180, domain-integrated contextual response model 170, and synthetic generator engine 140. At block 10, the synthetic data generator engine 140 accesses data; at block 12, generates a first training dataset; at block 14, generates a second training dataset; and at block 16 communicates the first training dataset and the second training dataset to cause training and deployment of a domain-integrated response model.

At block 20, the user client 180 receives a query at an artificial intelligence agent; and at block 22, communicates the query. At block 24, the domain-integrated contextual response model 170 accesses the query; at block 26, generates a response to the query; and at block 28, communicates the response. At block 30, the user client receives the response; and at block 32 causes display of the response.

Aspects of the technical solution have been described by way of examples and with reference to FIGS. 1A, 1B, and 2. FIG. 1A is a block diagram of an exemplary technical solution environment, based on example environments described with reference to FIGS. 6, 7 and 8 for use in implementing embodiments of the technical solution are shown. Generally the technical solution environment includes a technical solution system suitable for providing the example cloud computing system 100 in which methods of the present disclosure may be employed. In particular, FIG. 1A illustrates a high level architecture of the cloud computing system 100 in accordance with implementations of the present disclosure, among other engines, managers, generators, selectors, or components not shown (collectively referred to herein as "components").

Example Methods

With reference to FIGS. 3, 4, and 5, flow diagrams are provided illustrating methods for providing domain-integrated contextual response management using a domain-integrated contextual response engine in an artificial intelligence system. The methods may be performed using the design system described herein. In embodiments, one or more computer-storage media having computer-executable or computer-useable instructions embodied thereon that, when executed, by one or more processors can cause the one or more processors to perform the methods (e.g., computer-implemented method) in the design system (e.g., a computerized system).

Turning to FIG. 3, a flow diagram is provided that illustrates a method 300 for providing domain-integrated contextual response management using a domain-integrated contextual response engine in an artificial intelligence system. At block 302, access synthetic data comprising in-domain questions and out-of-domain questions. At block 304, generate a first training dataset based on answering the in-domain questions and out-of-domain questions. At block 306, generate a second training dataset associated with paraphrased versions of questions in the synthetic data. At block 308, train a domain-integrated contextual response model based on the first training dataset and the second training dataset.

Turning to FIG. 4, a flow diagram is provided that illustrates a method 400 for providing domain-integrated contextual response management using a domain-integrated contextual response engine in an artificial intelligence system. At block 402, communicate a query for a client associated with an artificial intelligence (AI) agent. At block 404, based on communicating the query, receive a response associated with the query. The response is generated based on a domain-integrated contextual response. The domain-integrated contextual response model is trained using a first training dataset, a second training dataset, and citation-and-filtration operations. At block 406, cause display of the response.

Turning to FIG. 5, a flow diagram is provided that illustrates a method 500 for providing domain-integrated contextual response management using a domain-integrated contextual response engine in an artificial intelligence system. At block 502 access data at a synthetic data generator. At block 504, generate synthetic data using the synthetic data generator. At block 506, generate a first training dataset based on the synthetic data. At block 508, generate a second training data set based on the synthetic data and the first training dataset. At block 510, generate a mixed training dataset of the first training dataset and the second training dataset for training (e.g., fine-tuning) a domain-integrated contextual response model.

Technical Improvement

Embodiments of the present techniques have been described with reference to several inventive features (e.g., operations, systems, engines, and components) associated with an artificial intelligence system. Inventive features described include: operations, interfaces, data structures, and arrangements of computing resources associated with providing the functionality described herein relative with reference to a domain-integrated contextual response engine. Functionality of the embodiments of the present invention have further been described, by way of an implementation and anecdotal examples—to demonstrate that the operations for providing the domain-integrated contextual response engine as a solution to a specific problem in artificial systems technology to improve computing operations in artificial intelligence systems.

By way of illustration, domain-integrated contextual response engine supports fine-tuning a smaller AI model on domain-specific data for Retrieval-Augmented Generation (RAG) tasks by utilizing skill and knowledge distillation from a more powerful mode. The domain-integrated contextual response engine supports creating synthetic data through techniques such as generating question-answer pairs, incorporating distractor documents, and introducing out-of-domain question. In particular, the synthetic data is used to generate training datasets (e.g., a first training dataset and a second training dataset) to train the model in effectively retrieving relevant information and accurately responding to inquiries while declining irrelevant ones.

For example, a user logs into a customer support platform and types in a query: "Can you explain the features of your latest software update?" The fine-tuned AI model processes the input, utilizing its Retrieval-Augmented Generation (RAG) capabilities to search through a client-specific database, which includes relevant documents detailing the software features. Upon retrieving the pertinent information, the model generates a concise and informative response, citing specific sections from the documentation. Additionally, it recognizes that the user's question is directly within the domain, allowing it to provide a comprehensive answer without declining to respond. The user receives a well-structured reply enhancing their understanding of the software update.

Additional Support for Detailed Description

Example Artificial Intelligence (AI) System in a Computing Environment

Figure 6:
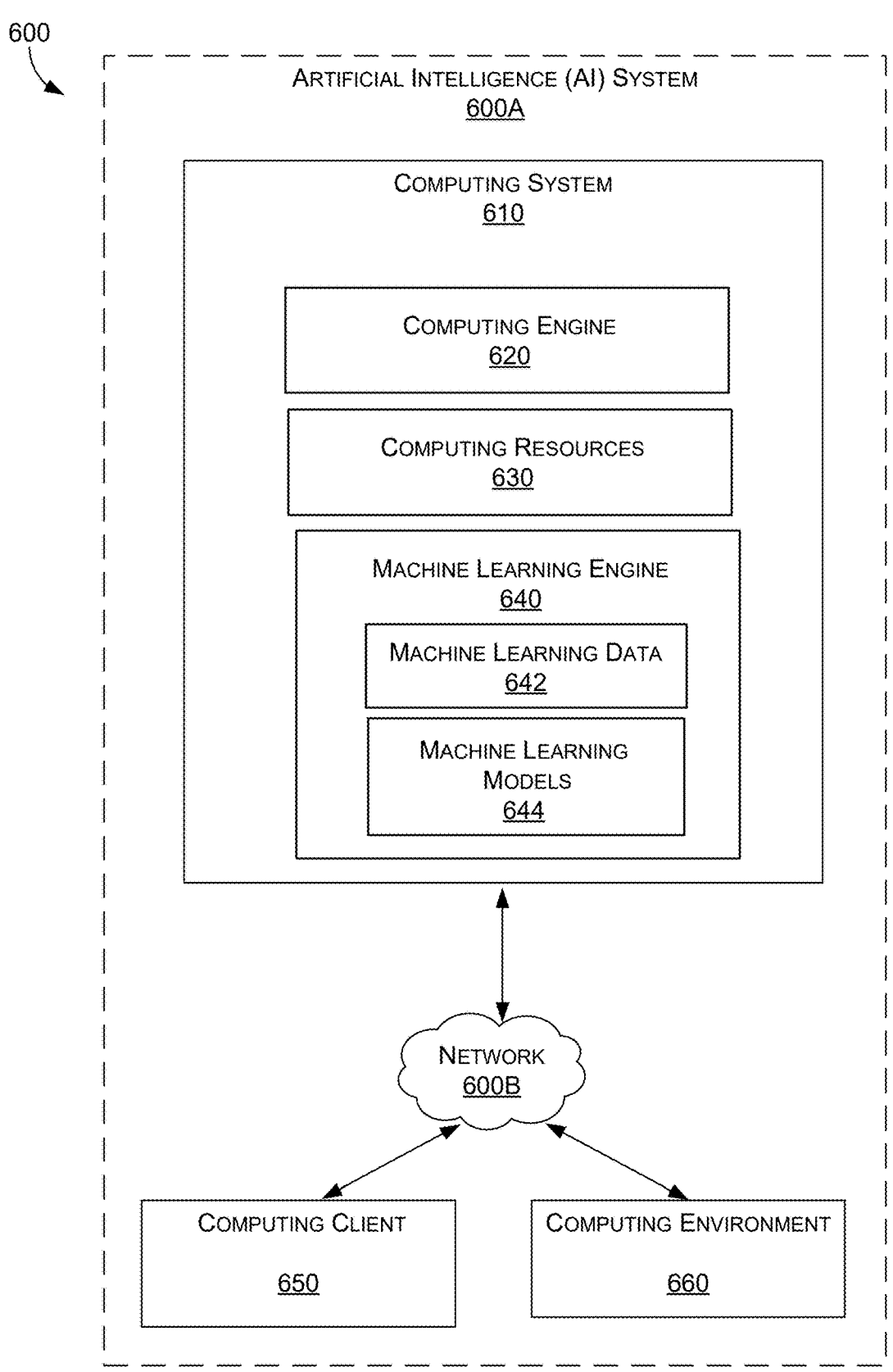
FIG. 6 provides a block diagram of an exemplary computing system suitable for use in implementing aspects of the technology described herein.

Referring now to FIG. 6, FIG. 6 illustrates a computing environment in which implementations of the present disclosure may be employed. In particular, FIG. 6 shows a high level architecture of an example cloud computing platform 600, artificial intelligence (AI) system 600A, and computing system 610 that can host a technical solution environment. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The cloud computing platform 600 provides computing system resources for different types of managed computing environments. For example, the cloud computing platform supports delivery of computing services-including compute, servers, storage, databases, networking, and intelligence. The components of cloud computing environment 600 may communicate with each other over a network 600B which may include, without limitation, one or more local area networks (LANs) and/or wide area networks (WANs).

The AI system 600A provides a specialized infrastructure designed to support the computational demands of artificial intelligence (AI) workloads, including both training and inference tasks. The AI backend network systems 600A consists of interconnected components that facilitate the efficient processing, communication, and management of data within a distributed computing environment. Operations include data processing, handling input data, intermediate results, and output data, alongside complex computations for AI tasks, communication facilitating seamless interaction among components, and resource management overseeing optimal utilization of compute nodes, accelerators (e.g., GPUs, TPUs), memory, and storage. Interfaces encompass network interfaces enabling high-speed communication between nodes, APIs providing standardized interaction methods for developers, and management interfaces for system monitoring and administration. Data support functionalities include storage, data movement, transformation, and replication with backup mechanisms, ensuring data durability and reliability. In this way, the AI backend network system serves as the backbone infrastructure for AI workloads, facilitating efficient and scalable AI processing across distributed computing environments through its comprehensive operations, interfaces, and data management functionalities.

The cloud computing platform 600 provides the foundational infrastructure and resources for deploying and managing computing workloads, including AI. AI system 600A includes specialized infrastructures tailored for supporting the unique computational demands of AI workloads. The relationship between the two involves resource provisioning, integration, orchestration, and data processing, enabling organizations to leverage cloud-based resources effectively for AI development and deployment.

The computing system 610 provides computing functionality for computing environments. For example, the computing system 610 is a platform or framework that leverages advanced technologies such as artificial intelligence (AI), machine learning (ML), data mining, and big data analytics to extract actionable insights and knowledge from large and complex datasets. In this way, the computing system 610 provides a computing environment that enables organizations to make informed decisions and optimize operations.

The computing system 610 includes a computing engine 620 that is a computing environment that supports executing computational tasks associated with the computing system 610. The computing engine 620 can be a hardware or software component that performs computational operations, such as, mathematical calculations, data processing, and algorithm execution. The computing system 610 integrates computing resources 630 into computing engine 610 to effectively provide computing functionality in a computing environment.

The computing resources 630 refer to computing elements (e.g., components, capability, or entities) that collectively enable the computing engine 620 operations. The computing resources 630 encompass a spectrum of computing elements, beginning with the diverse operations the computing resources 630 can perform, ranging from complex computations to data manipulations. Interfaces, an integral part of the computing resources 630, provide the means for both user interaction and seamless integration with external systems, ensuring a dynamic and interactive computing experience. The data facet of the data computing resources 630 involves various types: input data, which is the information provided for processing; processing data, representing the data manipulated during computational tasks; and output data, the results generated by the computing engine 620. In this way, the computing resources 630 support the broader computing engine 620 and computing system 610.

Machine learning engine 640 is a machine learning framework or library that operates as a tool for providing infrastructure, algorithms, capabilities for designing, training, and deploying machine learning models. The machine learning engine 640 can include pre-built functions and APIs that enable building and applying machine learning techniques. The machine learning engine 140 can provide a machine learning workflow from data processing and feature extraction to model training, evaluation, and deployment.

Machine learning data 642 refers to the structured or unstructured information used to train, validate, and test machine learning models. This machine learning data 642 typically comprises input features (also known as independent variables or predictors) and their corresponding target values (also known as dependent variables or labels). Machine learning data 642 can come from various sources, such as databases, sensor readings, text documents, images, audio recordings, or streaming data sources. Machine learning data 642 may require preprocessing, cleaning, and transformation to ensure its suitability for training machine learning models. Additionally, machine learning data 642 is often divided into training, validation, and testing sets to assess the performance and generalization ability of trained models accurately.

Machine learning models 644 are algorithms or mathematical representations that learn patterns and relationships from the provided data to make predictions or decisions without being explicitly programmed. Machine learning models 644 models are trained using the machine learning data 642, where they iteratively adjust their internal parameters or coefficients to minimize prediction errors or maximize performance metrics. Machine learning models 644 can be classified into various types based on their learning algorithms and the nature of the problem they address, including supervised learning models (e.g., regression, classification), unsupervised learning models (e.g., clustering, dimensionality reduction), and reinforcement learning models. Once trained, machine learning models 644 can be deployed in production environments to make predictions on new, unseen data instances. Regular evaluation and monitoring of model performance are essential to ensure their accuracy, reliability, and effectiveness in real-world applications.

The computing client 650 supports access to computing system 610. The computing client 650 can be provided as a user client or an administrator client to support user and administrator functionality associated with the computing environment 660, computing engine 620, or computing system 610. The computing client 650 can also support accessing computing visualizations and causing display of the computing visualization. The computing client 650 can include a computing engine client that supports receiving computing information associated computing engine 620 output from the computing system 610 and causing presentation of the computing information. The computing information can specifically include computing visualizations associated with the computing engine 620 output.

Computing environment 660 is a computing environment that is integrated into the computing system 610. The computing environment 660 is characterized by an infrastructure, where data from various sources within the ecosystem, including servers, networks, applications, sensors, and user interactions, can be aggregated and processed by the computing system 610 to perform computing tasks. The computing environment 660 can be associated with middleware and integration layers facilitate seamless data flow, while computing infrastructure, encompassing cloud-based resources, distributed computing frameworks, and optimized storage systems, supports functionality associated with the computing.

Example Distributed Computing System Environment

Figure 7:
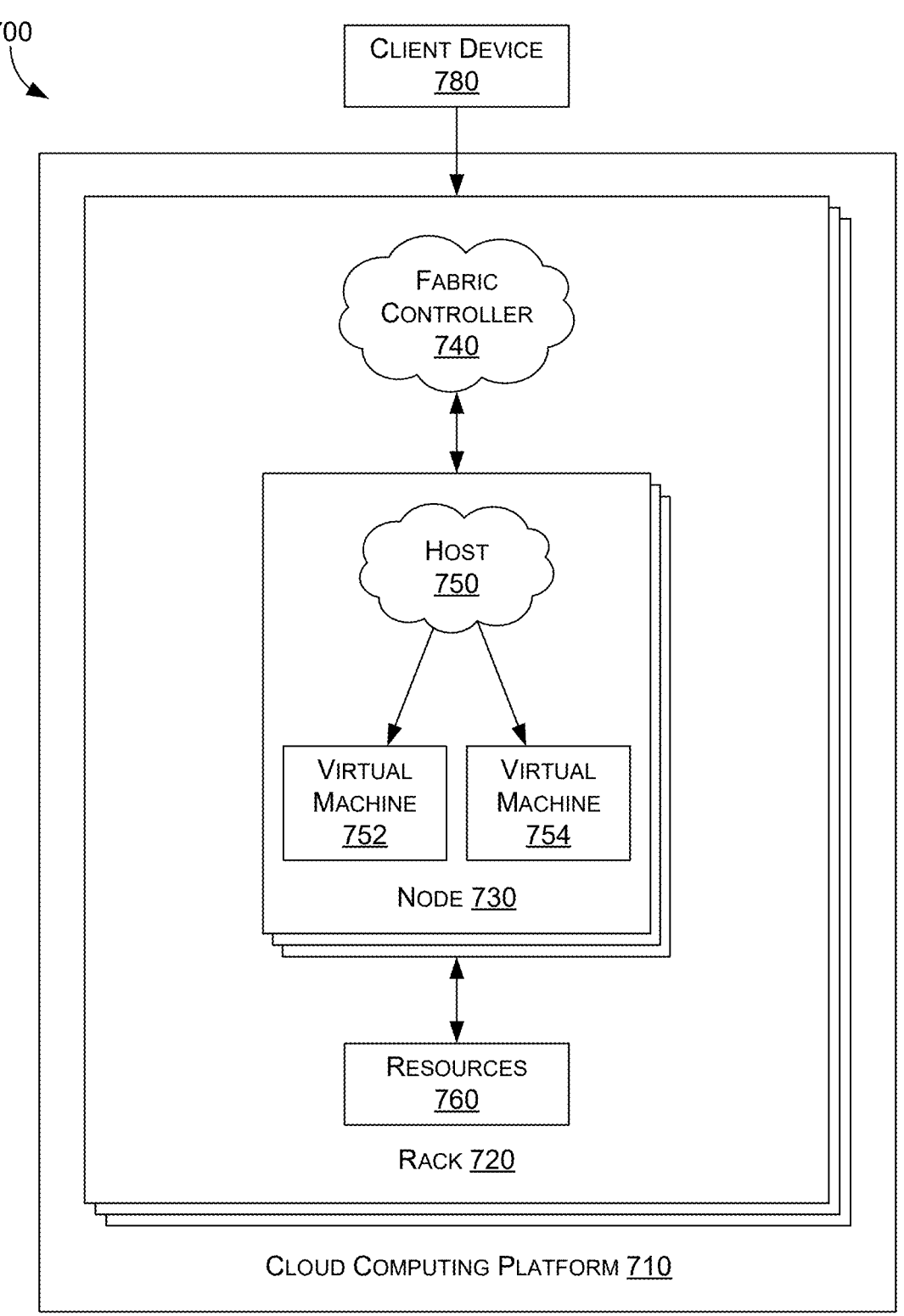
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
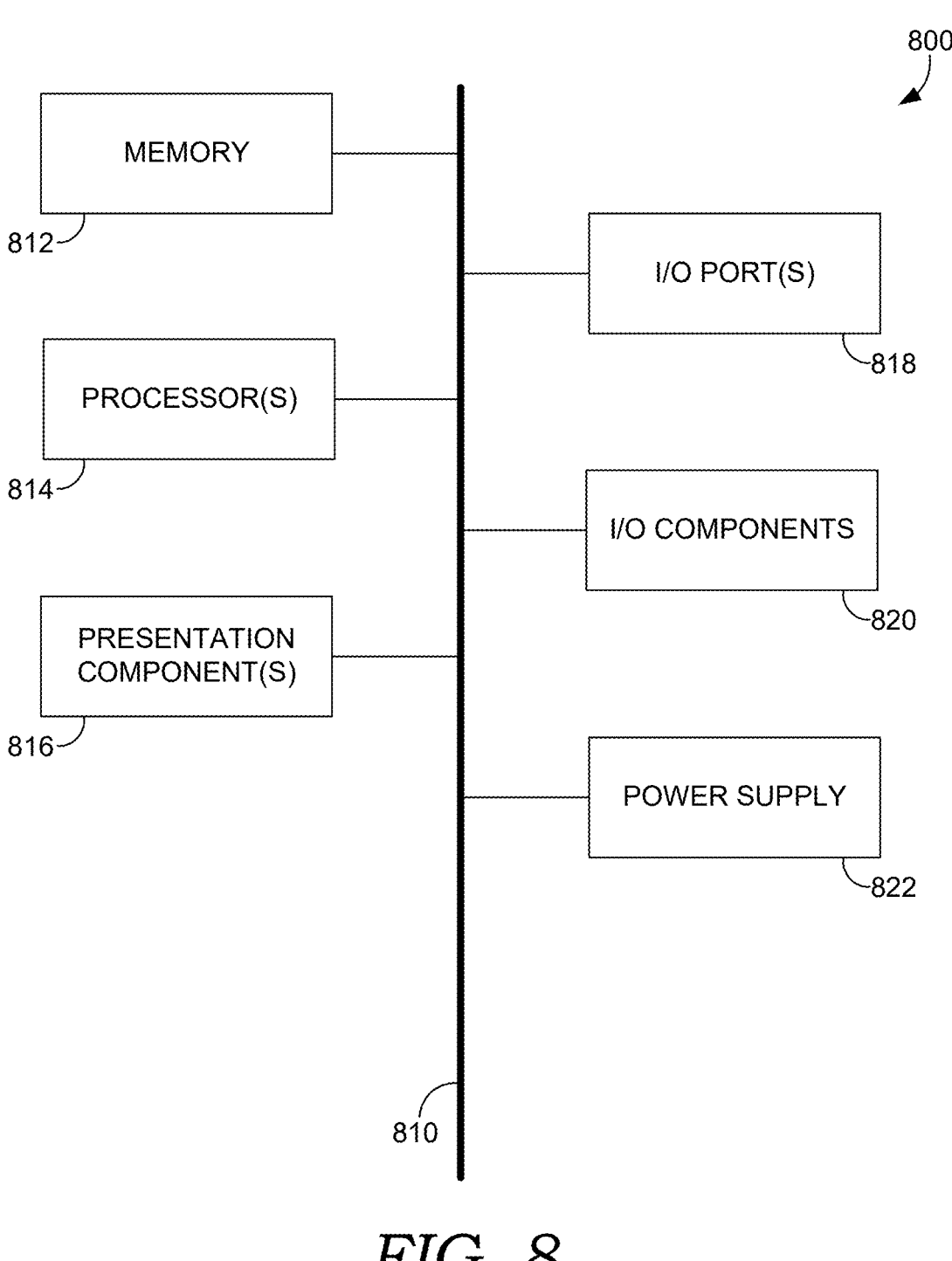
FIG. 8 provides a block diagram of an exemplary computing environment suitable for use in implementing aspects of the technology described herein.

Having briefly described an overview of embodiments of the present technical solution, an example operating environment in which embodiments of the present technical solution may be implemented is described below in order to provide a general context for various aspects of the present technical solution. Referring initially to FIG. 8 in particular, an example operating environment for implementing embodiments of the present technical solution is shown and designated generally as computing device 800. Computing device 800 is but one example of a suitable computing environment and is not intended to suggest any limitation as to the scope of use or functionality of the technical solution. Neither should computing device 800 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present technical solution. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

For purposes of this disclosure the word "support" refers to provisioning of functionality, services, or assistance by a computing component or through computing operations within a broader computing system. When a computing component or set of operations supports a specific functionality, it means that it plays a role in enabling or executing that particular aspect of the computing system. This support can manifest in various ways, including the processing of data, execution of operations, management of resources, and ensuring compatibility or interoperability with other components. Additionally, support may involve providing interfaces, APIs (Application Programming Interfaces), or protocols that allow seamless interaction and integration with other elements of the computing system. The concept of support extends beyond mere functionality provision to encompass maintenance, troubleshooting, and the overall optimization of computing resources to ensure the robust and efficient operation of the computing system.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations, the operations comprising:

accessing synthetic data comprising questions, the synthetic data is generated based on a synthetic data generator engine, wherein the questions include in-domain questions and out-of-domain questions;

generating a first training dataset, wherein generating the first training dataset is based on answering the in-domain questions and the out-of-domain questions in the synthetic data, wherein answering the in-domain questions and the out-of-domain questions is based on citation-and-filtration operations that provide citations for the in-domain questions and decline answering out-of-domain questions;

generating a second training dataset, wherein generating the second training dataset is based on one or more paraphrased versions of the questions in the synthetic data; and training a domain-integrated contextual response model based on the first training dataset and the second training dataset.

2. The system of claim 1, wherein the synthetic data generator engine is associated with a data distillation engine for the first training dataset and a data post-processing engine for the second training dataset.

3. The system of claim 1, wherein the first training dataset is associated with data distillation associated with two or more of the following: quiz questions, multi-chunk conversations, golden chunks, distractor documents, out-of-domain questions, and distilled answers.

4. The system of claim 1, wherein the second training dataset is associated with data post-processing associated with or more of the following: paraphrase quiz questions, paraphrase quiz answers, paraphrased multi-chunk conversations, post-process citation formatting, and distractor documents for paraphrased questions.

5. The system of claim 1, wherein the synthetic data generator engine comprises citation-and-filtration operations that are associated with training and inference processes of the domain-integrated contextual response model that support citing relevant sources of information and filtering out irrelevant or out-of-domain questions.

6. The system of claim 1, further comprising a domain-integrated contextual response engine comprising a Retrieval-Augment Generation (RAG) agent and a Large Language Model ("LLM"), wherein the domain-integrated contextual response model is trained to emulate RAG capabilities of the LLM to generate response based on retrieved information.

7. The system of claim 1, the operations comprising:

receiving a query from a client associated with an artificial intelligence (AI) agent;

using the domain-integrated contextual response model, generating a response associated with the query; and communicating the response to cause display of the response.

8. One or more computer-storage media having computer-executable instructions embodied thereon that, when executed by a computing system having a processor and memory, cause the processor to perform operations, the operations comprising:

communicating, a query from a client associated with an artificial intelligence (AI) agent;

based on communicating the query, receiving a response associated with the query, wherein the response is generated based on a domain-integrated contextual response model that is trained using a synthetic data generator engine, a first training dataset, a second training dataset and citation-and-filtration operations, wherein the first training dataset is generated based on questions including in-domain questions and out-of-domain questions, the second training dataset is generated based on paraphrased versions of the questions, and the citation-and-filtration operations provide citations for the in-domain questions and decline answer out-of-domain questions; and causing display of the response to the query.

9. The media of claim 8, wherein the first training dataset is associated with data distillation associated with two or more of the following: quiz questions, multi-chunk conversations, golden chunks, distractor documents, out-of-domain questions, and distilled answers.

10. The media of claim 8, wherein the second training dataset is associated with data post-processing associated with or more of the following: paraphrase quiz questions, paraphrase quiz answers, paraphrased multi-chunk conversations, post-process citation formatting, and distractor documents for paraphrased questions.

11. The media of claim 8, wherein the response is generated based on processing the query and executing the citation-and-filtration operations, wherein citation operations support providing explicit references to sources of retrieved information, and wherein the citation-and-filtration operations support recognizing when a question is out-of-domain.

12. The media of claim 8, wherein the synthetic data generator engine is associated with a data distillation engine for the first training dataset and a data post-processing engine for the second training dataset.

13. The media of claim 8, wherein the synthetic data generator is associated with a domain-integrated contextual response engine comprising a Retrieval-Augment Generation (RAG) agent and a Large Language Model ("LLM"), wherein the domain-integrated contextual response model is trained to emulate RAG capabilities of the LLM to generate response based on retrieved information.

14. The media of claim 8, wherein an interface of the client is configured to generate one or more interface elements associated with the response, wherein the response comprises one or more citations and one or more out-of-domain questions.

15. A computer-implemented method, the method comprising:

accessing data at a synthetic data generator engine;

generating synthetic data using the synthetic data generator engine;

generating a first training dataset based on the synthetic data, wherein the first training dataset is generated based on answering in-domain question and out-of-domain questions, wherein answering the in-domain questions and the out-of-domain questions is based on citation-and-filtration operations that provide citations for the in-domain questions and decline answering out-of-domain questions;

generating a second training dataset based on the synthetic data and the first training dataset, wherein the second training dataset is generated based on paraphrasing one or more versions of the questions in the synthetic data; and generating a mixed training dataset of the first training dataset and the second training dataset for training and fine-tuning a domain-integrated contextual response model.

16. The method of claim 15, wherein the synthetic data generator engine is associated with a data distillation engine for the first training dataset and a data post-processing engine for the second training dataset.

17. The method of claim 15, wherein the first training dataset is associated with data distillation associated with two or more of the following: quiz questions, multi-chunk conversations, golden chunks, distractor documents, out-of-domain questions, and distilled answers.

18. The method of claim 15, wherein the second training dataset is associated with data post-processing associated with or more of the following: paraphrase quiz questions, paraphrase quiz answers, paraphrased multi-chunk conversations, post-process citation formatting, and distractor documents for paraphrased questions.

19. The method of claim 15, wherein the synthetic data generator engine comprises citation-and-filtration operations that are associated with training and inference processes of the domain-integrated contextual response model that support citing relevant sources of information and filtering out irrelevant or out-of-domain questions.

20. The method of claim 15, wherein the synthetic data generator engine associated with a domain-integrated contextual response engine comprising a Retrieval-Augment Generation (RAG) agent and a Large Language Model ("LLM"), wherein the domain-integrated contextual response model is trained to emulate RAG capabilities of the LLM to generate response based on retrieved information.

* * * * *